(12) United States Patent
Peterson et al.

(10) Patent No.: US 9,826,399 B2
(45) Date of Patent: Nov. 21, 2017

(54) FACILITATING WIRELESS NETWORK ACCESS BY USING A UBIQUITOUS SSID

(71) Applicant: Apple Inc., Cupertino, CA (US)

(72) Inventors: Jason P. Peterson, San Ramon, CA (US); M. Terry Simons, San Jose, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 14/098,338

(22) Filed: Dec. 5, 2013

(65) Prior Publication Data

US 2014/0196126 A1 Jul. 10, 2014

Related U.S. Application Data

(60) Provisional application No. 61/748,875, filed on Jan. 4, 2013.

(51) Int. Cl.
*H04W 12/06* (2009.01)
*H04L 29/06* (2006.01)
*H04W 80/00* (2009.01)

(52) U.S. Cl.
CPC ........ *H04W 12/06* (2013.01); *H04L 63/0272* (2013.01); *H04W 80/00* (2013.01)

(58) Field of Classification Search
CPC ..... H04L 9/32–9/3297; H04L 63/04–63/0892; G06F 21/30–21/46; G06F 21/60–21/645
See application file for complete search history.

(56) References Cited

U.S. PATENT DOCUMENTS

| 8,019,296 | B1* | 9/2011 | Durig ..................... 455/127.4 |
| 2004/0103282 | A1* | 5/2004 | Meier ................ G06Q 20/3674 713/171 |
| 2004/0185845 | A1* | 9/2004 | Abhishek .............. H04W 88/08 455/422.1 |
| 2005/0165953 | A1* | 7/2005 | Oba et al. ..................... 709/238 |
| 2009/0073943 | A1* | 3/2009 | Krishnaswamy ..... H04W 88/04 370/338 |
| 2012/0269082 | A1* | 10/2012 | Morper ............... H04L 43/0852 370/252 |
| 2013/0333016 | A1* | 12/2013 | Coughlin et al. ................ 726/9 |
| 2014/0287751 | A1* | 9/2014 | Lee ....................... H04W 48/16 455/434 |
| 2014/0362807 | A1* | 12/2014 | Bhatnagar et al. ........... 370/329 |

\* cited by examiner

*Primary Examiner* — Ashok Patel
*Assistant Examiner* — Quazi Farooqui
(74) *Attorney, Agent, or Firm* — Sterne, Kessler, Goldstein & Fox P.L.L.C.

(57) ABSTRACT

The disclosed embodiments provide a system that facilitates wireless network access. The system includes a trusted network access and tunneling service (TNATS) associated with a ubiquitous static service set identifier (SSID). The system also includes a proximate wireless access point (WAP). During operation, the system enables the TNATS on the proximate WAP, which then broadcasts the ubiquitous static SSID. Next, the proximate WAP receives a request from a guest device to access the TNATS through the proximate WAP. The proximate WAP then initiates an authentication process with the TNATS for a user of the guest device. If the authentication succeeds, the proximate WAP allows the guest device to access a network through the proximate WAP.

29 Claims, 4 Drawing Sheets

FACILITATING WIRELESS NETWORK ACCESS BY USING A UBIQUITOUS SSID

RELATED APPLICATION

This application claims priority under 35 U.S.C. §119 to U.S. Provisional Application No. 61/748,875, entitled "Facilitating Wireless Network Access by Using a Ubiquitous SSID," by Jason P. Peterson and Terry M. Simons, filed 4 Jan. 2013, the contents of which are herein incorporated by reference in their entirety.

BACKGROUND

Field

The disclosed embodiments relate to techniques for facilitating wireless network access for wireless devices. More specifically, the disclosed embodiments relate to techniques for providing a ubiquitous SSID to facilitate wireless network access for wireless devices.

Related Art

Recent improvements in computing power and wireless networking technology have significantly increased the capabilities of portable electronic devices. For example, laptop computers, tablet computers, portable media players, smartphones, and/or other modern computing devices are typically equipped with wireless and/or cellular networking capabilities that allow the computing devices to retrieve webpages, stream audio and/or video, and/or transfer files wirelessly among one another.

A wireless device is often surrounded by many wireless local area networks (WLANs) that can potentially provide access to the Internet. These WLANs make use of different security protocols, and different authentication techniques to obtain access to these wireless networks. For example, each of the available WLANs may broadcast a unique service set identifier (SSID) through one or more associated access points (APs), where each WLAN uses a unique authentication credential. A wireless device searching for network access may be able to "see" these available WLANs, but still cannot access any network if it does not possess the required credentials for the available WLANs.

Hence, what is needed is a method and a system that enables a wireless device to gain access to a wireless network more easily.

SUMMARY

The disclosed embodiments provide a system that facilitates wireless network access. The system includes a trusted network access and tunneling service (TNATS) associated with a ubiquitous static service set identifier (SSID). The system also includes a proximate wireless access point (WAP). During operation, the system enables the TNATS on the proximate WAP, which then broadcasts the ubiquitous static SSID. Next, the proximate WAP receives a request from a guest device to access the TNATS through the proximate WAP. The proximate WAP then initiates an authentication process with the TNATS for a user of the guest device. If the authentication succeeds, the TNATS allows the guest device to access a network through the proximate WAP.

In some embodiments, the TNATS allows the guest device to access the network through the proximate WAP by first establishing a secure tunnel between the proximate WAP and a remote home WAP, wherein the remote home WAP is a home WAP for the user of the guest device. Next, the TNATS allows traffic from the guest device to travel through the secure tunnel to the remote home WAP and then through an interface on the remote home WAP to access the network.

In some embodiments, prior to establishing the secure tunnel, the remote home WAP is configured to broadcast the ubiquitous static SSID and to create a tunnel for a future guest device to access. This configuration process can involve using credentials belonging to the user of the guest device (who might also be the administrator for the remote home WAP) to authenticate with the TNATS.

In some embodiments, the TNATS allows the guest device to access the network through a second secure tunnel from the proximate WAP to the TNATS. More specifically, the TNATS establishes the second secure tunnel between the guest device and the TNATS through the proximate WAP. The TNATS subsequently allows traffic for the guest device to travel through the second secure tunnel and then through an interface associated with the TNATS to access the network.

In some embodiments, if the proximate WAP is the actually the home WAP for the user of the guest device, the network associated with the proximate WAP is trusted. In this case, a secure tunnel is unnecessary and no secure tunnel is created.

In some embodiments, the proximate WAP authenticates with the TNATS to enable the ubiquitous static SSID on the proximate WAP.

In some embodiments, the proximate WAP initiates the authentication process with the TNATS by transmitting the credentials associated with an administrator for the proximate WAP to the TNATS.

In some embodiments, the TNATS includes an Apple iCloud™ service, and the ubiquitous static SSID includes an Apple iCloud™ ID.

In some embodiments, the credentials of the user of the guest device include an Apple ID™ and Apple iCloud™ credentials.

In some embodiments, the proximate WAP grants the guest device local access to the proximate WAP's local area network while allowing the guest device to access the network.

In some embodiments, the proximate WAP disallows the guest device local access to the proximate WAP's local area network while allowing the guest device to its WAN network.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
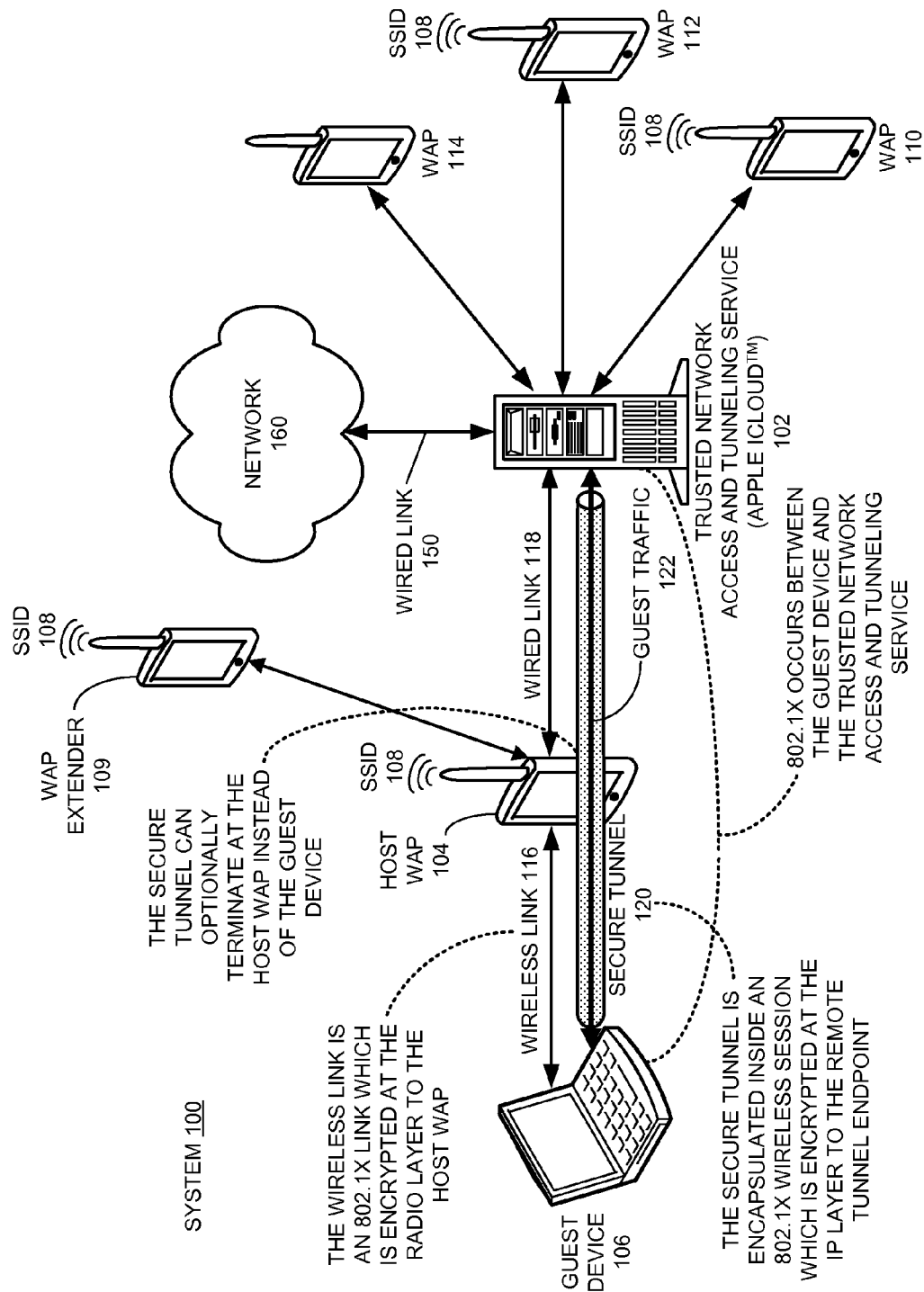
FIG. 1 illustrates a system which facilitates a guest device to access a network in accordance with some embodiments herein.

Some disclosed embodiments provide techniques for enabling wireless devices to securely access network services by providing a ubiquitous service set identifier (SSID). FIG. 1 illustrates a system 100 which enables a guest device to access a network in accordance with some embodiments herein. As shown in FIG. 1, system 100 may include a trusted network access and tunneling service (TNATS) 102 that is hosted by servers to provide secure network services, including Internet services. In one embodiment, TNATS 102 is a well-known service provider that is associated with a unique and trusted SSID (also referred to as "the ubiquitous static SSID" or "the ubiquitous SSID" hereinafter) with 802.1X enabled. In a particular embodiment, TNATS 102 is the Apple iCloud™ service that provides both cloud storage and cloud computing services, and is associated with a ubiquitous "iCloud™" SSID or other alternatives that can be easily recognized as the Apple iCloud™ service.

TNATS 102 is coupled to network 160, which can include any type of wired or wireless communication channel capable of coupling together computing nodes. This includes, but is not limited to, a local area network, a wide area network, or a combination of networks. In one embodiment of the present invention, network 160 includes the Internet. In some embodiments, network 160 includes phone and cellular phone networks.

System 100 also includes a host wireless access point (WAP) 104 that is wirelessly/wire coupled to TNATS 102. When TNATS 102 is enabled on host WAP 104, host WAP 104 allows a wireless device/client, such as guest device 106 to connect to TNATS 102 and to gain access to network 160 via host WAP 104 using Wi-Fi, or other wireless network access protocols. Note that guest device 106 can include laptop computers, tablet computers, portable media players, smartphones, and/or other modern computing devices equipped with wireless capabilities.

In one or more embodiments, host WAP 104 is configured to broadcast a ubiquitous SSID 108 associated with TNATS 102. Wireless clients, such as guest device 106, can easily identify TNATS 102 through ubiquitous SSID 108 published by host WAP 104. In particular, when TNATS 102 is the Apple iCloud™ service, ubiquitous SSID 108 can be the iCloud™ service SSID "iCloud™" or its equivalent (we will use "iCloud™" hereinafter). Note that host WAP 104 may be simultaneously connected to the Internet through an Internet service provider (not shown) other than TNATS 102.

In some embodiments, system 100 of FIG. 1 includes functionality to enable guest device 106 to connect to TNATS 102 via host WAP 104. During operation, an admin for host WAP 104 (or a "host AP admin") enables TNATS 102 and ubiquitous SSID 108 on host WAP 104. More specifically, the host AP admin first configures host WAP 104 to associate ubiquitous SSID 108 with TNATS 102. As part of the configuration process, host WAP 104 authenticates itself to TNATS 102 with authentication credentials. In particular, if TNATS 102 is the Apple iCloud™ service, host WAP 104 authenticates itself by using the Apple ID and iCloud™ credentials of the host AP admin. If the authentication succeeds, host WAP 104 is registered with TNATS 102, and ubiquitous SSID 108 is enabled on host WAP 104.

Host WAP 104 subsequently broadcasts ubiquitous SSID 108 associated with TNATS 102 for potential wireless client connections. When guest device 106 travels within the broadcast range of host WAP 104, guest device 106 detects the ubiquitous SSID 108 from host WAP 104. Guest device 106 may then send a request to host WAP 104 to access TNATS 102. When host WAP 104 receives the request, host WAP 104 may initiate an authentication process for a user of guest device 106 with TNATS 102. In one embodiment, guest device 106 uses a built-in supplicant to initiate the authentication process, wherein the authentication process may be based on RADIUS, EAPOL or other authentication protocols. In particular, when TNATS 102 is the Apple iCloud™ service, guest device 106 can be authenticated with the iCloud™ service using the existing Apple ID and iCloud™ credentials of the user of the guest device (if such credentials have been previously established).

In addition to guest device 106, any wireless client that is located within the effective broadcast range of host WAP 104 may attempt to connect to TNATS 102 via host WAP 104. If TNATS 102 is the Apple iCloud™ service, multiple wireless clients may be connected to TNATS 102 through host WAP 104, provided that these clients possess valid Apple ID and iCloud™ credentials and can be successfully authenticated. In some embodiments, host WAP 104 does not broadcast the iCloud™ SSID unless it is able to provide the authentication service on behalf of the Apple iCloud™ service.

Note that system 100 can include additional WAPs, such as WAPs 110-114, which are also coupled to TNATS 102. In some embodiments, one or more WAPs 110-114 have TNATS 102 enabled and can broadcast the same ubiquitous SSID 108 as host WAP 104. By scanning the wireless channels, guest device 106 can discover multiple WAPs publishing ubiquitous SSID 108. Guest device 106 may selectively send a request to one or more of the detected WAPs to access TNATS 102. Multiple WAPs may be preemptively authenticated to, but only one WAP will be actively used for network traffic at a time. For example, guest device 106 may choose an available WAP among the multiple WAPs based on the strength of the signal.

When guest device 106 is successfully authenticated with TNATS 102, guest device 106 is granted access to TNATS 102 through a wireless link 116 between guest device 106 and host WAP 104, and a wired link 118 between host WAP 104 and TNATS 102. Subsequently, guest device 106 is allowed to access network 160 through a wired link 150 between TNATS 102 and network 160. In one embodiment, after connecting to TNATS 102, guest device 106 may itself begin broadcasting ubiquitous SSID 108, thereby acting as a new WAP to facilitate other wireless clients to connect to TNATS 102 through guest device 106. Note that guest device 106 may not be able to modify ubiquitous SSID 108. In this embodiment, when guest device 106 disconnects from TNATS 102, guest device 106 also disables ubiquitous SSID 108. However, guest device 106 can disable ubiquitous SSID 108 at any time without disconnecting from TNATS 102 and network 160.

In some embodiments, other WAP devices, such as WAP extender 109, may extend the wireless networks of host WAP 104, optionally including SSID 108. Note that range-extending WAPs may not be able to modify ubiquitous SSID 108.

Figure 2:
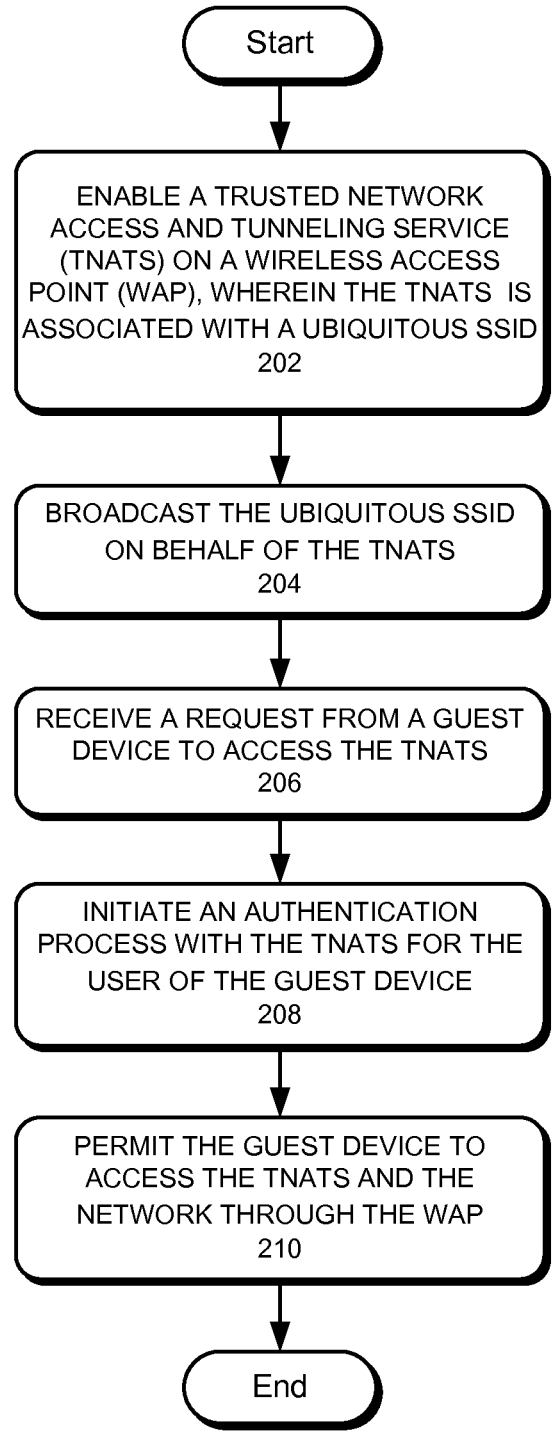
FIG. 2 presents a flowchart illustrating the process of facilitating a guest device to securely access network service using a ubiquitous SSID in accordance with some embodiments herein.

FIG. 2 presents a flowchart illustrating the process of facilitating a guest device to securely access network service using a ubiquitous SSID in accordance with some embodiments herein. During operation, a trusted network access and tunneling service (TNATS), such as TNATS 102, is enabled on a WAP, such as host WAP 104, or a WAP extender, such as WAP extender 109 wherein the TNATS is associated with a ubiquitous SSID (step 202). Note that step 202 typically involves authenticating the WAP with the TNATS. The WAP extender may adopt its configuration solely from WAP 104. In one embodiment, the TNATS is enabled on the WAP only when a wireless client attempts to connect to the TNATS. In another embodiment, the TNATS is enabled on the WAP after a wireless device has connected to the TNATS and consequently configured itself as the WAP. In one embodiment, the WAP is a dedicated AP of the TNATS, and the TNATS is enabled on the WAP by an admin of the WAP.

The WAP subsequently broadcasts the ubiquitous SSID on behalf of the TNATS and awaits potential wireless client requests (step 204). Next, the WAP receives a request from a wireless guest device (such as guest device 106) to access the TNATS through the WAP (step 206). It is assumed that the guest device has identified the TNATS based on the ubiquitous SSID published by the WAP. The WAP may then initiate an authentication process with the TNATS for the user of the guest device (step 208). In one embodiment, the WAP transmits authentication credentials of the user of the guest device to the TNATS, wherein the authentication process is performed by the server of the TNATS. (To mitigate the potential man-in-the-middle problem of a rogue WAP, the supplicant of the Apple iCloud™ service can reject non-Apple signed certificates for the 'iCloud' SSID.)

If the authentication of the guest device succeeds, the guest device is permitted to access the TNATS and the network through the WAP (step 210). In one embodiment, enabling the TNATS on the guest device provides "full access," such that the guest device is also granted local access to the WAP, which can include access to some or all local files and services on the WAP, in addition to being allowed to access the TNATS and the network. In another embodiment, enabling the TNATS on the guest device includes "guest restrictions," such that the guest device is not granted local access to the WAP while being allowed to access the TNATS and the network. In one embodiment, the guest device which has the TNATS enabled may be configured as a new WAP to broadcast the ubiquitous SSID. However, if the authentication of the guest device fails, the guest device is not allowed to access the TNATS and the associated network.

If an authentication fails for reasons unknown to the guest device, or if the guest device determines that the WAP may be a rogue access point, it may instantiate countermeasures to prevent further attempts to connect to the WAP. This may include blacklisting the WAP so that it is not a candidate for wireless association.

If an authentication fails for above stated reasons the guest device may transmit diagnostic information to the NAS once it has successfully authenticated via a properly functioning NAS to facilitate the ability to troubleshoot legitimate WAPs that may be experiencing problems. This includes the MAC address of the problematic device as well as location data. (For example, in the case of an iCloud™ system, this data could be used by iCloud to send a push notification to the owner of a legitimate WAP to inform them of a misbehaving iCloud SSID.) Push notifications could also be sent to devices that are legitimately connected to the ubiquitous SSID that are in a physically similar location to the problematic WAP to help those devices make better roaming decisions, if roaming becomes necessary to maintain connectivity.

While the above discussion assumes that the WAP is trusted by the guest device, in practice, guest devices may be hesitant to enable a service through a WAP that they are not sure they can trust. Further, rogue APs may show up on wireless channels pretending to be the ubiquitous (e.g., iCloud) SSID. Moreover, some users providing a legitimate ubiquitous SSID might try to sniff traffic from guest devices connected to the network via their WAPs.

For security of the guest device and the TNATS, after successful authentication, the guest device may access the TNATS and the network through a secure tunnel. Referring back to FIG. 1, note that after connecting to TNATS 102, TNATS 102 may first establish a secure tunnel 120 from guest device 106 to TNATS 102 through host WAP 104. Note that secure tunnel 120 can be implemented using any existing tunneling protocol. Next, guest traffic 122 associated with guest device 106 is encrypted and allowed to securely travel through secure tunnel 120 and then through wired link 150 to network 160. In one embodiment, guest traffic 122 is not encrypted in a secure tunnel.

Figure 3:
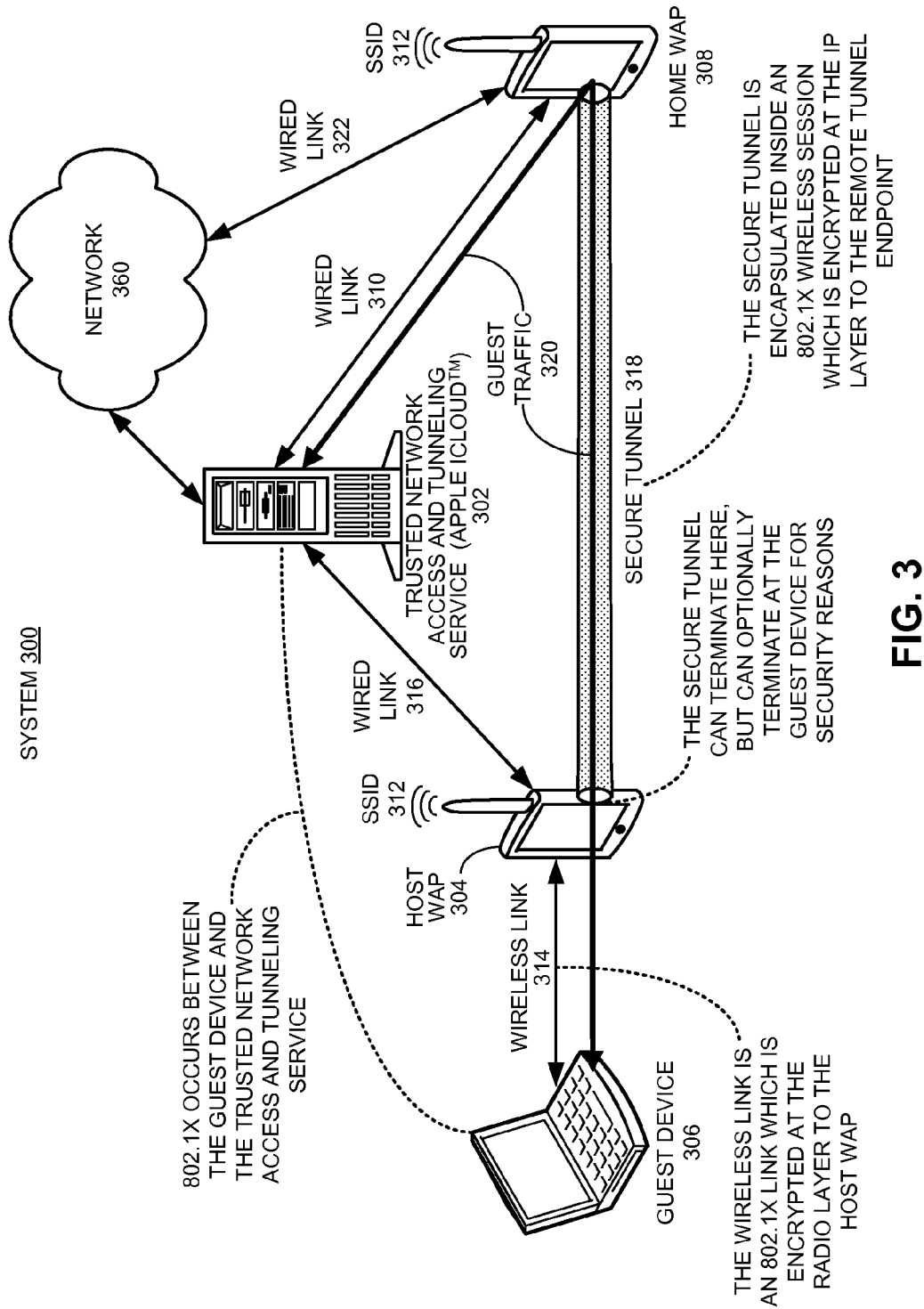
FIG. 3 illustrates a system which facilitates a guest device to access a network through a guest home access point (AP) in accordance with some embodiments herein.

FIG. 3 illustrates a system 300 which facilitates a guest device to access a network through a guest home access point (AP) in accordance with some embodiments herein.

Similar to system 100 in FIG. 1, system 300 also includes a trusted network access and tunneling service (TNATS) 302 which is coupled to network 360, a host WAP 304, and a guest device 306 which attempts to connect to NAS 302. System 300 additionally includes a guest home WAP 308 (or "home WAP 308") which can be configured to allow a guest home device (not shown) to connect to a wired network service using Wi-Fi, or other wireless network access protocols. In particular, guest device 306 and guest home WAP 308 have the same user/admin, referred to as a home AP admin. Note that this home AP admin is the same as the user of guest device 306. For example, guest device 306 may be an iPhone of a user A, while guest home WAP 308 may be an Apple Wi-Fi base station of the same user. Note that guest home WAP 308 communicates with TNATS 302 through a wired link 310. In one embodiment, TNATS 302 is a well-known service provider which is identified by a ubiquitous SSID. For example, when TNATS 302 is the Apple iCloud™ service, the ubiquitous SSID can be configured as "iCloud™."

In one embodiment, a host AP admin enables TNATS 302 on host WAP 304 using the techniques described above, which also enables a ubiquitous SSID 312 associated with TNATS 302. Host WAP 304 subsequently broadcasts ubiquitous SSID 312 for potential wireless client connections. Consequently, wireless clients, such as guest device 306, can easily identify TNATS 302 through ubiquitous SSID 312 published by host WAP 304. Similar to system 100, system 300 can use the techniques described in conjunction with FIGS. 1 and 2 to enable guest device 306 to connect to TNATS 302 for accessing network 360 through host WAP 304. This includes establishing a wireless link 314 between guest device 306 and host WAP 304, and a secure tunnel (not shown) between guest device 306 and TNATS 302 by tunneling through host WAP 304.

Figure 4:
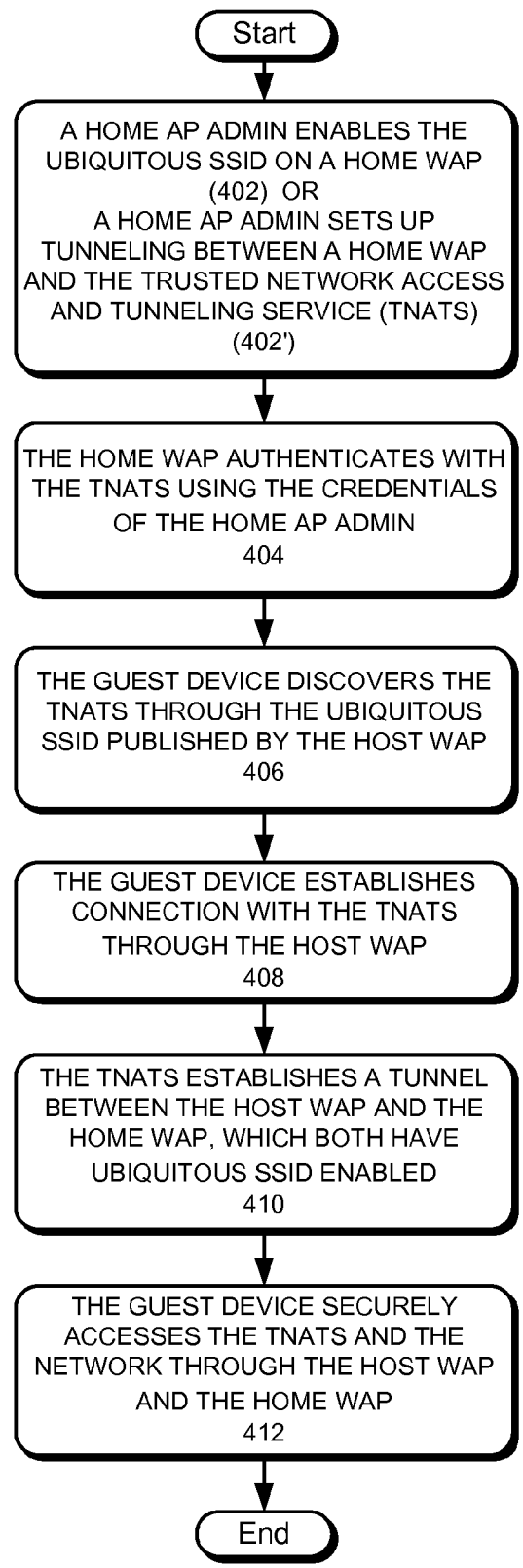
FIG. 4 presents a flowchart illustrating the process of facilitating the guest device to securely access the network through a guest home AP in accordance with some embodiments herein.

In some embodiments, system 300 of FIG. 3 also includes functionality to enable guest device 306 to securely access network 360 by tunneling to home WAP 308. FIG. 4 presents a flowchart illustrating the process of facilitating guest device 306 to securely access network 360 through a guest home AP in accordance with some embodiments herein.

During operation, the home AP admin first enables ubiquitous SSID 312 on home WAP 308 (step 402). Alternatively, instead of performing step 402, the home AP admin can set up tunneling between home WAP 308 and TNATS 302 (step 402'). Home WAP 308 then authenticates with TNATS 302 using the credentials of the home AP admin (i.e., the credentials of the user of guest device 306) (step 404). In particular, if TNATS 302 is the Apple iCloud™ service, home WAP 308 authenticates with the iCloud™ service using the Apple ID and iCloud™ credentials of the home AP admin/the user of guest device 306. If the authentication succeeds, home WAP 308 is connected to TNATS 302 with ubiquitous SSID 312 enabled. In one embodiment, authenticating home WAP 308 also allows guest device 306 to be registered with the iCloud™ service.

Note that steps 402-404 are performed over wired link 310. At this point, the home AP admin can specify a user-configurable option that any time guest device 306 accesses TNATS 302 through a host AP that is outside the control of the home AP admin (e.g., host WAP 304 providing ubiquitous SSID 312), the guest traffic be tunneled back to home WAP 308. However, this action may not be required if such preference is set as default in the user-configurable option on home WAP 308.

Next, guest device 306 discovers TNATS 302 through ubiquitous SSID 312 published by host WAP 304 (step 406). It is assumed that host WAP 304 has been previously authenticated and enabled TNATS 302 through a wired link 316. Guest device 306 subsequently establishes connection with TNATS 302 through wireless link 314 and wired link 316 via host WAP 304 (step 408). As earlier described, step 408 involves guest device 306 authenticating to TNATS 302 using authentication credentials of the user of guest device 306. Note that these authentication credentials used by guest device 306 are the same ones used to authenticate home WAP 308 with TNATS 302 in step 404. In particular, if TNATS 302 is the Apple iCloud™ service, the authentication credentials used by guest device 306 are the Apple ID and iCloud™ credentials of the user of guest device 306.

Note that when the connection is established, guest device 306 begins accessing TNATS 302 and network 360 through host WAP 304 which is outside the control of the home AP admin. Consequently, the TNATS 302 automatically establishes a secure tunnel between guest device 306 and home WAP 308, wherein both APs have been authenticated with TNATS 302 and have ubiquitous SSID 312 enabled (step 410). Next, guest device 306 can securely access network 360 via the TNATS 302 through host WAP 304 and home WAP 308 (step 412).

FIG. 3 illustrates a secure tunnel 318 established between host WAP 304 and home WAP 308, and the flow of guest traffic 320 associated with guest device 306. As can be seen in FIG. 3, encrypted guest traffic 320 can traverse a secure path between guest device 306 and home WAP 308 comprised of wireless link 314 and secure tunnel 318. Because home WAP 308 has been previously authenticated with TNATS 302 and is trusted by guest device 306, guest traffic 320 can further securely traverse wired link 310 between home WAP 308 and TNATS 302. Consequently, home WAP 308 provides a network interface for guest device 306 to securely access the TNATS 302 and therefore network 360.

In some embodiments, home WAP 308 may be directly connected to network 360 through a wired link 322 without having to go through TNATS 302. In these embodiments, TNATS 302 is not utilized to create secure tunnel 318, and guest device 306 can securely access network 360 directly through wired link 316 between host WAP 304 and network 360 which bypasses TNATS 302. In these embodiments, guest device 306 must still authenticate with valid credentials to TNATS 302, but its traffic will not be encrypted in a tunnel once the network authentication completes.

Note that while secure tunnel 318 in FIG. 3 is shown to be established only between host WAP 304 and home WAP 308, in some embodiments secure tunnel 318 can extend over wired link 310 to TNATS 302 and/or over wireless link 314 to guest device 306. Note that secure tunnel 318 can be implemented using any existing or future tunneling protocol.

The above-described embodiments provide techniques for facilitating wireless devices to securely access network services by providing a ubiquitous SSID. Some described techniques ensure that any time a guest device is connected to an AP that is outside the control of the guest device admin, the guest traffic is encrypted and tunneled securely to a trusted party (e.g., the guest device admin's home AP or a trusted network access and tunneling service). Consequently, the described techniques protect against man-in-the-middle attacks on the guest device by rogue APs, including both curious and malicious snooping on the guest traffic.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating wireless network access, comprising:
enabling a trusted network access and tunneling service (TNATS) on a proximate wireless access point (WAP), wherein the TNATS is associated with a ubiquitous static service set identifier (SSID);
broadcasting the ubiquitous static SSID;
receiving a request from a guest device to access the TNATS through the proximate WAP;
initiating an authentication process with the TNATS for a user of the guest device;
upon successful authentication, establishing a first secure tunnel between the proximate WAP and a home WAP, wherein the home WAP and the guest device are associated with the same credential of the user for authenticating with the TNATS;
allowing the guest device to access the TNATS through the first secure tunnel between the proximate WAP and the home WAP;
allowing the guest device to broadcast the ubiquitous static SSID, the guest device enabling the TNATS on the guest device so that other wireless devices are able to access the TNATS through the guest device; and
disabling the ubiquitous SSID in response to the guest device disconnecting from the TNATS.

2. The method of claim 1, wherein prior to establishing the first secure tunnel, the home WAP is configured to broadcast the ubiquitous static SSID and to create a tunnel for a future guest device to access.

3. The method of claim 2, wherein the configuration process comprises using the credential of the user of the guest device to authenticate with the TNATS.

4. The method of claim 1, further comprising:
establishing a second secure tunnel between the proximate WAP and the guest device; and
allowing the guest device to access the TNATS through the first secure tunnel and the second secure tunnel between the guest device and the home WAP.

5. The method of claim 4, wherein the first and second secure channels are encapsulated inside an 802.1X wireless session encrypted at the Internet Protocol (IP) layer.

6. The method of claim 1, wherein enabling the TNATS on the proximate WAP comprises authenticating the proximate WAP with the TNATS to enable the ubiquitous static SSID on the proximate WAP.

7. The method of claim 1, wherein initiating the authentication process with the TNATS comprises transmitting credentials associated with an administrator for the proximate WAP to the TNATS.

8. The method of claim 1, wherein the TNATS comprises an Apple iCloud™ service, and wherein the ubiquitous static SSID comprises an Apple iCloud™ ID.

9. The method of claim 8, wherein the credential of the user of the guest device comprises an Apple ID™ and Apple iCloud™ credentials.

10. The method of claim 1, wherein allowing the guest device to access the TNATS comprises granting the guest device local access to the proximate WAP's local area network while allowing the guest device to access the TNATS.

11. The method of claim 1, wherein allowing the guest device to access the TNATS comprises disallowing the guest device local access to the proximate WAP's local area network while allowing the guest device to access the TNATS.

12. The method of claim 1, wherein each of the proximate WAP, the home WAP, and the guest device is configured to broadcast the ubiquitous static SSID associated with the TNATS.

13. A system that facilitates wireless network access, comprising:
a trusted network access and tunneling service (TNATS) associated with a ubiquitous static service set identifier (SSID);
a proximate wireless access point (WAP) configured to:
enable the TNATS and the ubiquitous static SSID;
broadcast the ubiquitous static SSID;
receive a request from a guest device to access the TNATS; and
initiate an authentication process with the TNATS for a user of the guest device; and
a home WAP configured to:
broadcast the ubiquitous static SSID; and
initiate an authentication process with the TNATS using the same credential of the user of the guest device for authenticating the guest device with the TNATS, wherein the TNATS is configured to:
upon successful authentication, establish a first secure tunnel between the proximate WAP and the home WAP and a second secure tunnel between the proximate WAP and the guest device;
allow the guest device to access the TNATS through the first and second secure tunnels between the guest device and the home WAP; and
allow the guest device to broadcast the ubiquitous static SSID, the guest device enabling the TNATS on the guest device so that other wireless devices are able to access the TNATS through the guest device; and
disable the ubiquitous SSID in response to the guest device disconnecting from the TNATS.

14. The system of claim 13, wherein prior to establishing the first secure tunnel, the home WAP is configured to create a tunnel for a future guest device to access.

15. The system of claim 14, wherein the configuration process comprises using the credential of the user of the guest device to authenticate with the TNATS.

16. The system of claim 13, wherein while enabling the TNATS on the proximate WAP, the proximate WAP is configured to authenticate with the TNATS to enable the ubiquitous static SSID on the proximate WAP.

17. The system of claim 13, wherein the proximate WAP is configured to initiate the authentication process with the TNATS by transmitting credentials associated with an administrator for the proximate WAP to the TNATS.

18. The system of claim 13, wherein the proximate WAP is configured to grant the guest device local access to the proximate WAP while allowing the guest device to access the TNATS.

19. The system of claim 13, wherein the proximate WAP is configured to disallow the guest device local access to the proximate WAP while allowing the guest device to access the TNATS.

20. A non-transitory computer-readable storage medium storing instructions that when executed by a computer cause the computer to perform a method for facilitating wireless network access, the method comprising:
enabling a trusted network access and tunneling service (TNATS) on a proximate wireless access point (WAP), wherein the TNATS is associated with a ubiquitous static service set identifier (SSID);
broadcasting the ubiquitous static SSID;
receiving a request from a guest device to access the TNATS through the proximate WAP;
initiating an authentication process with the TNATS for a user of the guest device;
upon successful authentication, establishing a first secure tunnel between the proximate WAP and a home WAP and a second secure channel between the proximate WAP and the guest device, wherein the home WAP and the guest device are associated with the same credential of the user for authenticating with the TNATS;
allowing the guest device to access the TNATS through the first and second secure tunnels between the guest device and the home WAP;
allowing the guest device to broadcast the ubiquitous static SSID, the guest device enabling the TNATS on the guest device so that other wireless devices are able to access the network through the guest device; and disabling the ubiquitous SSID in response to the guest device disconnecting from the TNATS.

21. The computer-readable storage medium of claim 20, prior to establishing the first secure tunnel, the home WAP is configured to broadcast the ubiquitous static SSID and to create a tunnel for a future guest device to access.

22. The computer-readable storage medium of claim 21, wherein the configuration process comprises using the credential of the user of the guest device to authenticate with the TNATS.

23. The computer-readable storage medium of claim 20, wherein enabling the TNATS on the proximate WAP comprises authenticating the proximate WAP with the TNATS to enable the ubiquitous static SSID on the proximate WAP.

24. The computer-readable storage medium of claim 20, wherein initiating the authentication process with the TNATS comprises transmitting credentials associated with an administrator for the proximate WAP to the TNATS.

25. The computer-readable storage medium of claim 24, wherein the TNATS comprises an Apple iCloud™ service, and wherein the ubiquitous static SSID comprises an Apple iCloud™ ID.

26. The computer-readable storage medium of claim 25, wherein the credential of the user of the guest device comprises an Apple ID™ and Apple iCloud™ credentials.

27. The computer-readable storage medium of claim 20, wherein allowing the guest device to access the TNATS comprises granting the guest device local access to the proximate WAP's local area network while allowing the guest device to access the TNATS.

28. The computer-readable storage medium of claim 20, wherein allowing the guest device to access the TNATS comprises disallowing the guest device local access to the proximate WAP's local area network while allowing the guest device to access the TNATS.

29. The computer-readable storage medium of claim 20, wherein each of the proximate WAP, the home WAP, and the guest device is configured to broadcast the ubiquitous static SSID associated with the TNATS.

* * * * *